(12) United States Patent
Amidi

(10) Patent No.: US 7,627,099 B2
(45) Date of Patent: Dec. 1, 2009

(54) SYSTEM AND METHOD FOR PROVIDING A BACKUP-RESTORE SOLUTION FOR ACTIVE-STANDBY SERVICE MANAGEMENT SYSTEMS

(75) Inventor: Erfan Amidi, Brookfield, WI (US)

(73) Assignee: AT&T Intellectual Property I, L.P., Reno, NV (US)

( * ) Notice: Subject to any disclaimer, the term of this patent is extended or adjusted under 35 U.S.C. 154(b) by 810 days.

(21) Appl. No.: 10/961,502

(22) Filed: Oct. 8, 2004

(65) Prior Publication Data

US 2006/0078092 A1    Apr. 13, 2006

(51) Int. Cl.
*H04M 15/00* (2006.01)
*H04M 7/00* (2006.01)

(52) U.S. Cl. .............. 379/112.02; 379/9.05; 379/221.04

(58) Field of Classification Search ............ 379/112.01, 379/112.02, 9.05, 221.03, 221.04, 221.08; 370/216, 219, 220; 707/202, 204; 709/213, 709/223
See application file for complete search history.

(56) References Cited

U.S. PATENT DOCUMENTS

| | | | |
|---|---|---|---|
| 5,212,789 A | 5/1993 | Rago | |
| 5,878,129 A | 3/1999 | Figurski et al. | |
| 5,890,156 A | 3/1999 | Rekieta et al. | |
| 6,009,430 A * | 12/1999 | Joseph et al. | ................. 707/10 |
| 6,058,412 A | 5/2000 | Kojima et al. | |
| 6,098,076 A | 8/2000 | Rekieta et al. | |
| 6,169,794 B1 | 1/2001 | Oshimi et al. | |
| 6,704,849 B2 | 3/2004 | Steegmans | |
| 7,076,042 B1 * | 7/2006 | Praturi et al. | .......... 379/201.01 |
| 2003/0135404 A1 * | 7/2003 | Cheng et al. | .................... 705/9 |
| 2003/0172157 A1 * | 9/2003 | Wright et al. | ............... 709/225 |
| 2003/0233446 A1 | 12/2003 | Earl | |
| 2004/0139127 A1 | 7/2004 | Pofelski | |
| 2004/0139128 A1 | 7/2004 | Becker et al. | |

FOREIGN PATENT DOCUMENTS

JP        06348628 A   * 12/1994

OTHER PUBLICATIONS

"In Suite Release 7," Documentation 080-0000-548, Alcatel, Rev. 1, Sep. 2003, 118 pages.

* cited by examiner

*Primary Examiner*—Quoc D Tran
(74) *Attorney, Agent, or Firm*—Brinks Hofer Gilson & Lione

(57) ABSTRACT

The preferred embodiments described herein include a system and method for providing a backup-restore solution for active-standby service management systems. In one embodiment, a telecommunication system is disclosed having first and second service management systems (SMS), a storage device shared by the first and second SMSs and circuitry operative to provide backup/restore functionality. This provides system redundancy in that the second SMS can perform the same functions as the first SMS in the event that the first SMS is unavailable due to, for example, system failures, a scheduled maintenance, or an upgrade process. Other embodiments are provided, and each of the embodiments described herein can be used alone or in combination with one another.

16 Claims, 5 Drawing Sheets

SYSTEM AND METHOD FOR PROVIDING A BACKUP-RESTORE SOLUTION FOR ACTIVE-STANDBY SERVICE MANAGEMENT SYSTEMS

TECHNICAL FIELD

The present invention relates generally to telecommunication systems and in particular to data redundancy and fault tolerance in telecommunication systems.

BACKGROUND

A service management system (SMS) in an Advanced Intelligent Network (AIN) platform provides data for services logic needed for call traffic routing by a service control point (SCP). To provide data redundancy and fault tolerance in the AIN platform, the data that is provided by the SMS is often stored in several databases across identical but geographically dispersed SCPs. It is also desired to provide redundancy and fault tolerance to cover situations in which an SMS is unavailable due to, for example, system failures, a scheduled maintenance, or an upgrade process.

DETAILED DESCRIPTION OF THE PRESENTLY PREFERRED EMBODIMENTS

By way of introduction, the preferred embodiments described herein include a system and method for providing a backup-restore solution for active-standby service management systems. In one embodiment, a telecommunication system is disclosed having first and second service management systems (SMS), a storage device shared by the first and second SMSs and circuitry operative to provide backup/restore functionality. This provides system redundancy in that the second SMS can perform the same functions as the first SMS in the event that the first SMS is unavailable due to, for example, system failures, a scheduled maintenance, or an upgrade process. Other embodiments are provided, and each of the embodiments described herein can be used alone or in combination with one another.

Figure 1:
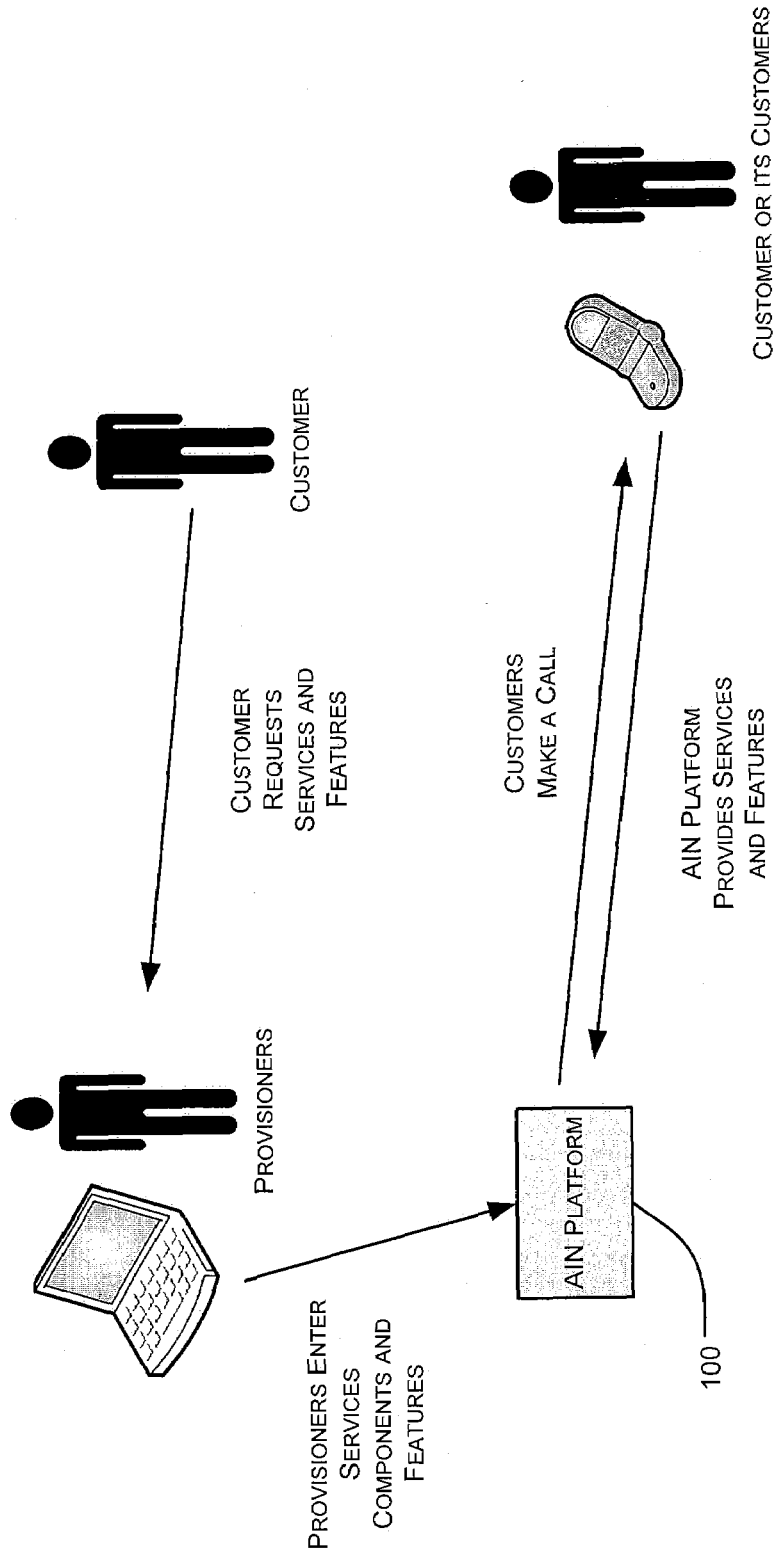
FIG. 1 is a block diagram of a telecommunication environment of a preferred embodiment comprising an Advanced Intelligent Network (AIN) platform.

Turning now to the drawings, FIG. 1 is an illustration of a telecommunication environment of a preferred embodiment comprising an Advanced Intelligent Network (AIN) platform 100. The AIN platform 100 is a telephone network architecture that separates service logic from switching equipment, allowing new services to be added without having to redesign switches to support the new services. The AIN platform 100 is a distributed, fault-tolerant, middleware product that provides low-level system management capabilities for telecommunications products. The AIN platform 100 comprises various components, whose complex and effective communications deliver real-time call routing capabilities associated with intelligent networks. FIG. 1 shows, at a very high-level, the functionality of the AIN platform 100. As shown in FIG. 1, a customer provides a request for telecommunication services and features to a provisioner of the AIN platform 100, and the provisioner enters the services components and features into the AIN platform 100. Once the AIN platform 100 is provisioned, it provides the requested services and features when the customer makes a call.

Figure 2:
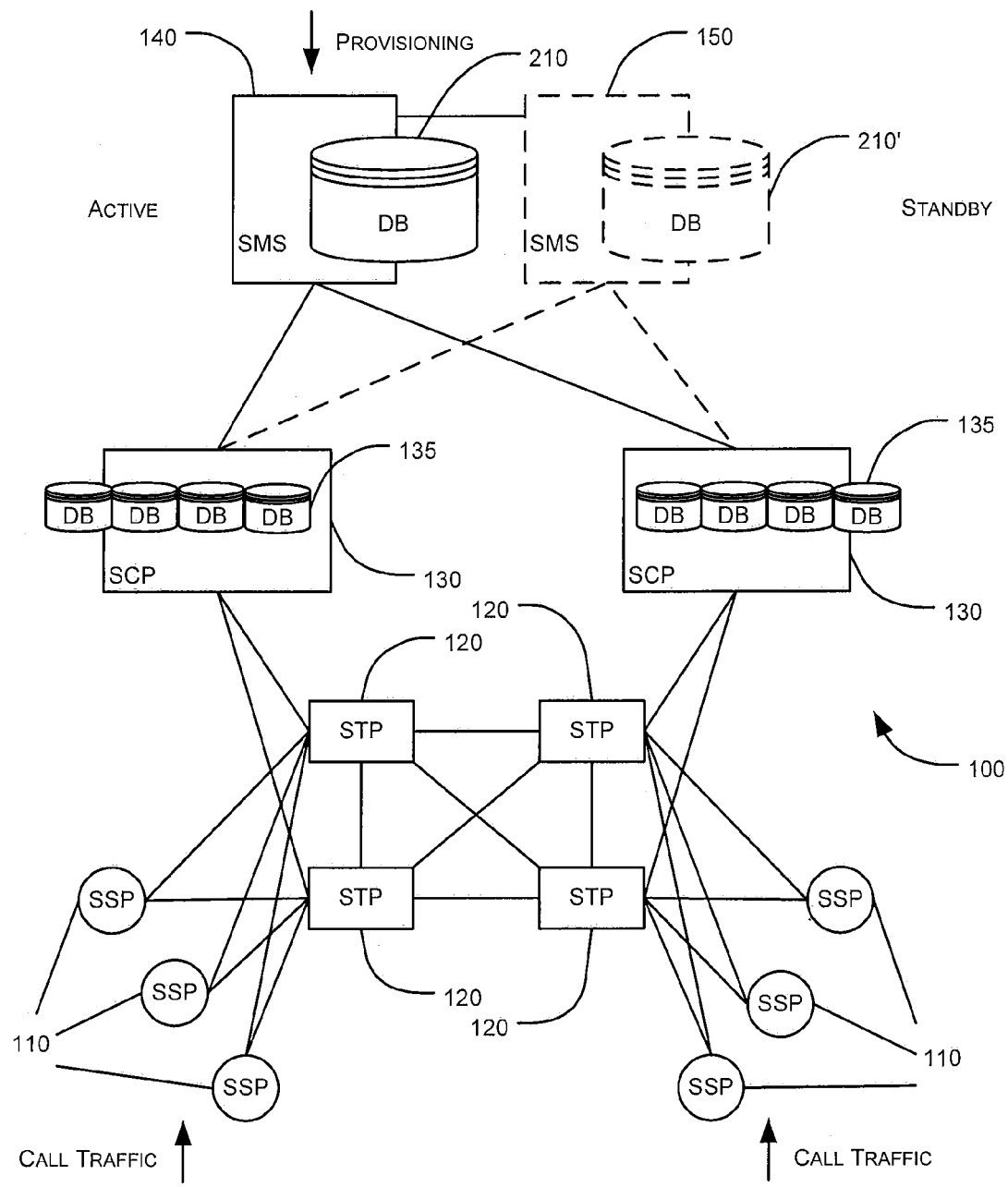
FIG. 2 is a block diagram of an AIN platform of a preferred embodiment.

FIG. 2 provides a more detailed illustration of the AIN platform 100. The AIN platform 100 comprises signal switching points (SSPs) 110, signal transfer points (STPs) 120, service control points (SCPs) 130, and two service management systems (SMSs)—one active (SMS 140) and one standby (SMS 150). The SSPs 110 and the SCPs 130 are connected via a common channel signaling network, preferably the Signaling System 7 (SS7) network, and the SCPs 130 are in communication with the SMSs 140, 150 through a data communications network, such as a local area network (LAN). As used herein, the phrase "in communication with" means directly in communication with or indirectly in communication with through one or more named or unnamed components. FIG. 2 also illustrates call traffic and services provisioning data flow in this platform 100.

By way of background, an SSP is a switch at a telephone company central office equipped with AIN software. When the SSP receives a number dialed by a caller, the SSP suspends call processing and launches a query to an SCP via an STP, which routes call traffic to the proper SCP. The SCP contains a database with service logic and handles queries sent from the SSP by consulting its database and returning information about how to handle the call to the SSP, which switches the call in accordance with the received information. In some cases, instead of sending a query to an SCP, a call can be handled more quickly by an Intelligent Peripheral (IP) attached to an SSP over a high-speed connection. For example, a customized voice announcement can be delivered by the IP in response to the dialed number, or a voice call can be analyzed and recognized.

Examples of services that can be provided by an SCP include, but are not limited to, toll-free services, account code services, and virtual private network (VPN) services. A toll-free service allows businesses to offer toll-free calls to their customers. When an SSP sends a toll-free call to an SCP, the toll-free service logic is accessed, which translates the dialed number by executing a call plan associated with the dialed number. The routing information is then returned to the SSP. An account code service validates caller identification and tracks usage of the service. This service is triggered when the caller makes an account code call. The SSP detects the trigger based upon the user's identity and sends the SCP a query message for treatment instructions. The SCP validates the account code and instructs the SSP to allow or disallow the call to proceed. A VPN service allows customers to implement features that are typically associated with dedicated network facilities and switches on a public switched telephone network. A customer may be a business with several geographically-dispersed locations, utilizing customized dial plans and customer profiles to define the specific features. Customers can access the VPN from a dedicated facility, dialing a 1-8xx remote number, or dialing a ten-digit public number from a switched location.

Figure 3:
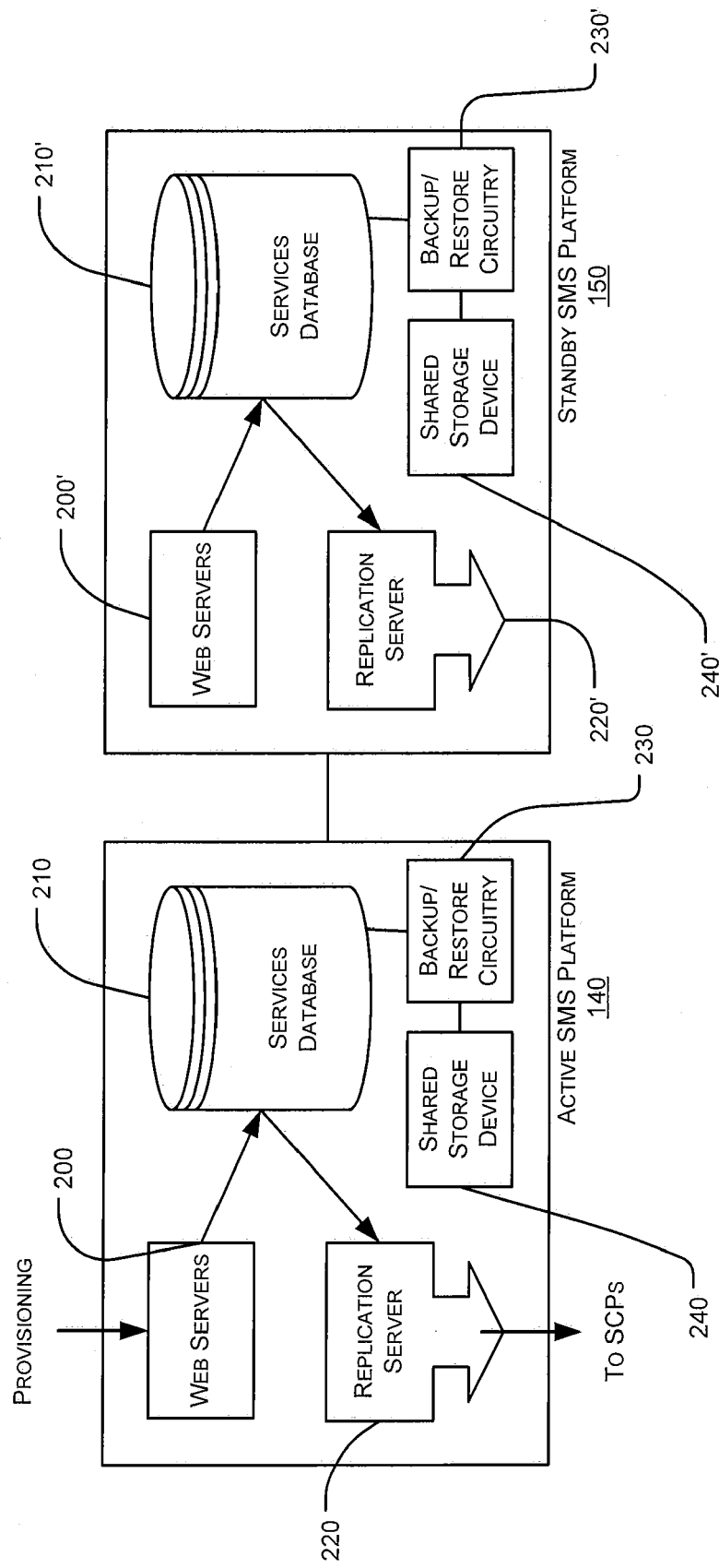
FIG. 3 is a block diagram of active and standby service management systems (SMSs) of a preferred embodiment.

The service logic in the SCP database is provisioned by an SMS, which centrally manages data additions and updates to the SCP databases. FIG. 3 is a block diagram of the active and standby SMSs 140, 150 of the AIN platform 100. These SMSs 140, 150 each comprise web servers 200, 200', a services database 210, 210', a replication server 220, 220', backup/ restore circuitry 230, 230', and a shared storage device 240, 240'. The services logic in the services database 210 is provisioned through a web-based GUI or batch processes, often referred to as Operation Support Systems (OSS). In operation, a customer provides a request for a telecommunication service (e.g., begin a toll-free service on a certain date and time), and the request is submitted to GUI and API (Application Programming Interface) web servers 200. The provisioning requests received by the web servers 200 are in HTML or XML format in this embodiment and are translated into calls-to-java servlets, which, in turn, enter services logic data into the SMS database 210. At the appropriate time, the replication server 220 replicates a relatively small subset of the data stored in the SMS database 210 to the SCP databases 135. The data replicated to the SCP databases 135 is preferably the minimal subset of data stored in the SMS database 210 that is sufficient for call traffic rerouting (i.e., the active services logic; the non-replicated data in the SMS database 210 can relate to historical and inactive services logic).

Each SCP 130 manages four identical Service Units (SU), and each SU hosts a services database 135 storing the services logic replicated by the replication server 220. This configuration provides eight identical databases across two identical but geographically dispersed SCPs 130. Each SCP load-balances the incoming queries across its four identical SU services databases. The data stored in each of the eight SU services databases is in sync with the other SU databases since the data is replicated from the same source—the SMS services database 210. This provides data redundancy and fault tolerance across the SCP databases 135, thereby helping to guarantee uninterrupted service to customers.

Because the SMS 140 is the provisioning platform for the AIN platform 100 and the only source of data for services logic needed for call traffic routing, it is preferred that a redundancy system also be provided for the SMS 140. To provide SMS fault tolerance in this embodiment, two SMSs are used—an active SMS 140 and a standby SMS 150. The active SMS 140 has a main subscriber database 210, which is copied to the SCPs 130, and the standby SMS 150 adapted to perform the same functions as the active SMS 140 in the event that the active SMS 140 is unavailable due to, for example, system failures, a scheduled maintenance, or an upgrade process. In other words, all provisioning and replication to the SCP SU databases 135 are carried out through the active SMS 140, and the standby SMS 150 provides a replica of the active SMS 140 and serves as a fail-over system to provide desired system redundancy. By incorporating two identical SMS systems—one active and one standby—high availability and maximum provisioning uptime is achieved. Provisioning occurs on the active SMS 140, and the standby SMS 150 is used as a fail-over system from the active SMS 140. In the case of active SMS 150 failure, the standby SMS 150 can be utilized so that provisioning can continue with minimum interruption. As such, it is preferred that the data stored on the standby SMS 150 be in-sync with the data stored on the active SMS 140 so a quick switchover can take place with no data loss.

In order to achieve highest availability for the SMS, it is preferred that (1) the switchover time from the active SMS 140 to the standby SMS 150 be minimized to provide a desired level of performance, (2) the switchover process be as automated as possible to avoid human errors typical to manual processes to provide a desired level of accuracy, and (3) the switchover process be scalable to accommodate growth in the SMS's database. Also, in order to minimize any outage during the switchover from the active SMS 140 to the standby SMS 150, the services database 210' on the standby SMS 150 should preferably be in-sync with the services database 210 on the active SMS 140.

To provide this level of redundancy in this preferred embodiment, both the active SMS 140 and the standby SMS 150 comprise backup/restore circuitry 230, 230' and a shared storage device 240, 240' (see FIG. 3). "Circuitry" can take any suitable form, including, but not limited to, a general-purpose processor executing computer-executable program code embodied on a computer-usable medium such as RAM or a disk, an application specific integrated circuit, and a programmable logic controller. It is important to note that any appropriate software and/or hardware, analog or digital, now in existence or later developed, can be used, and that "circuitry" can be a combination of hardware and software or hardware only. Also, it should be noted that "first circuitry" and "second circuitry," as used in the claims, can refer to two processors running two separate programs or a single processor running two separate programs or two parts of a single program. Similar usage applies to "third circuitry," "fourth circuitry," etc.

Preferably, the backup/restore circuitry 230, 230' residing on both the active and standby SMSs 140, 150 comprises a set of backup/restore computer programs. In this embodiment, the same set of backup/restore programs is stored on both the active and standby SMSs 140, 150, but only the backup programs are active on the active SMS 140, and only the restore programs are active on the standby SMS 150. The non-active programs remain dormant until the active (standby) SMS becomes the standby (active) SMS, in which case the dormant programs become active, and the active programs become dormant. It is preferred that the backup of the active SMS's database 210 be stored in the shared storage device 240' in the standby SMS 150 instead of the storage device 240 in the active SMS 140. In this way, if the active SMS fails while a load from the shared storage device to the standby SMS's database is in progress, the loading can continue with no interruption. Alternatively, the backup of the active SMS's database 210 can be stored in the shared storage device 240 in the active SMS 140.

The backup/restore circuitry 230 in the active SMS 140 automatically stores a backup of the active SMS's database 210 in the standby SMS's shared storage device 240', and the backup/restore circuitry 230' in the standby SMS 150 automatically copies the backup of the standby SMS's database from the shared storage device 240' to the standby SMS's database 210'. The storage devices 240, 240' are "shared" in the sense that data can be moved between the storage devices 240, 240' and the databases 210, 210' without physically moving the storage devices 240, 240'. This provides a full-automation solution that requires no human intervention to move the storage devices 240, 240' between the active and standby SMSs 140, 150, thereby avoiding human error and saving cost on labor. This is in contrast to a backup scheme that uses removal media, such as a digital tape, that requires a user to physically transport the tape from one SMS to the other. Such a manual procedure not only adds labor costs to the backup and restore process but also poses a risk due to human errors that manual processes are susceptible to. To further reduce the risk of human error, the backup/restore circuitry can handle the entire backup and restore process in an automated way with no human intervention (in contrast to inserting a tape into the active SMS on a nightly basis, manually initiating the backup function, manually removing the tape after the backup is completed and inserting it into the standby SMS, and manually initiating and monitoring the restore process on the standby SMS).

The shared storage device 240 can take any suitable form, including, but not limited to, a disk (i.e., magnetic, optical, etc.), a solid state storage device (e.g., RAM), tape, etc. It is preferred that a relatively-fast storage device, such as a disk storage device, be used over a relatively-slow storage device, such as tape. Disks have a much higher speed and throughput as compared to tapes, resulting in much shorter outages. For example, a backup/restore procedure using a shared disk drive that takes about an hour to perform can take about six hours to perform using tape. Accordingly, using a shared disk drive instead of tape can reduce provisioning outages (i.e., times when the SMS is operating in non-redundant mode) by a factor of six. Another benefit with using disk rather than tape is that disk storage does not have the same capacity limitation imposed by tape. Consider, for example, the situation in which a DDS3 tape capable of storing 17.6 GB worth of data is used to back up and restore a SMS database storing 19 GB of data. In this situation, two tapes would be needed, which increases switchover time, extends outages, and adds a tape-change procedure with its associated manual involvement and risk of errors. In contrast, a suitably-large disk drive can store four days worth of backups on a round-robin basis.

In a presently preferred embodiment, the circuitry 230, 230' each comprises a processor running programs that are UNIX korn shell scripts, with embedded Sybase Transact-SQL commands and queries. The tasks that each program performs are as follows. It is important to note that the details (e.g., times, etc.) and other limitations set forth below should not be read into the claims unless expressly recited therein.

NightlyDiskBkp.ksh

This program cleans up old database backups in the shared storage device. In this embodiment, database backups older than four days are removed from the shared storage device. This program initiates another program called dbdump.ksh. NightlyDiskBkp.ksh starts automatically at 12:45 AM on the active SMS 140 on daily basis and through a UNIX cron job. The time for automatic start was chosen based on other activities on the platform to minimize the contention on the platform.

dbdump.ksh

This program creates a backup of a database or all databases (based on parameters passed to the program) except tempdb, to the shared storage device. This program also communicates with an alarming system to notify Network Operation Center (NOC) personnel on success or any issues during the operations. This notification is sent in a form an IPR (Information and Problems Report). This program currently takes 40 minutes for all databases, including a services database with current size of 19 GB.

NightlyDiskLoad.ksh

This program starts automatically at 1:45 AM on daily basis on the standby SMS 150 and through a UNIX cron job. NightlyDiskLoad.ksh executes another program called dbload.ksh three times consecutively and for three databases called SMSCatalogs, gensms, and services. SMSCatalogs stores the data related to database backup history. The gensms database contains configuration parameters for SMS, SCPs, and the replication process, as well as information on transactions and their statuses. The services database contains core business information on services logics and provisioning history. NightlyDiskLoad.ksh also creates a log file at the end, which can be viewed by NOC personnel. This log file reports on time and success/failure status of the load process.

dbload.ksh

This program loads the database backups from the shared storage into the data server on the standby SMS 150. Dbload.ksh preferably does not load Sybase system databases since they are data server specific and are preferably not loaded from the active data server. This program brings SMSCatalogs database online, but gensms and services database are set to standby_access mode. If the loading databases are in use or the platform is not in the standby mode, the load preferably aborts the operations to avoid overwriting an active database. This is a safety measure to prevent any damage in case the program is used in ways that it is not designed for (e.g. database load on the active SMS).

Figure 4:
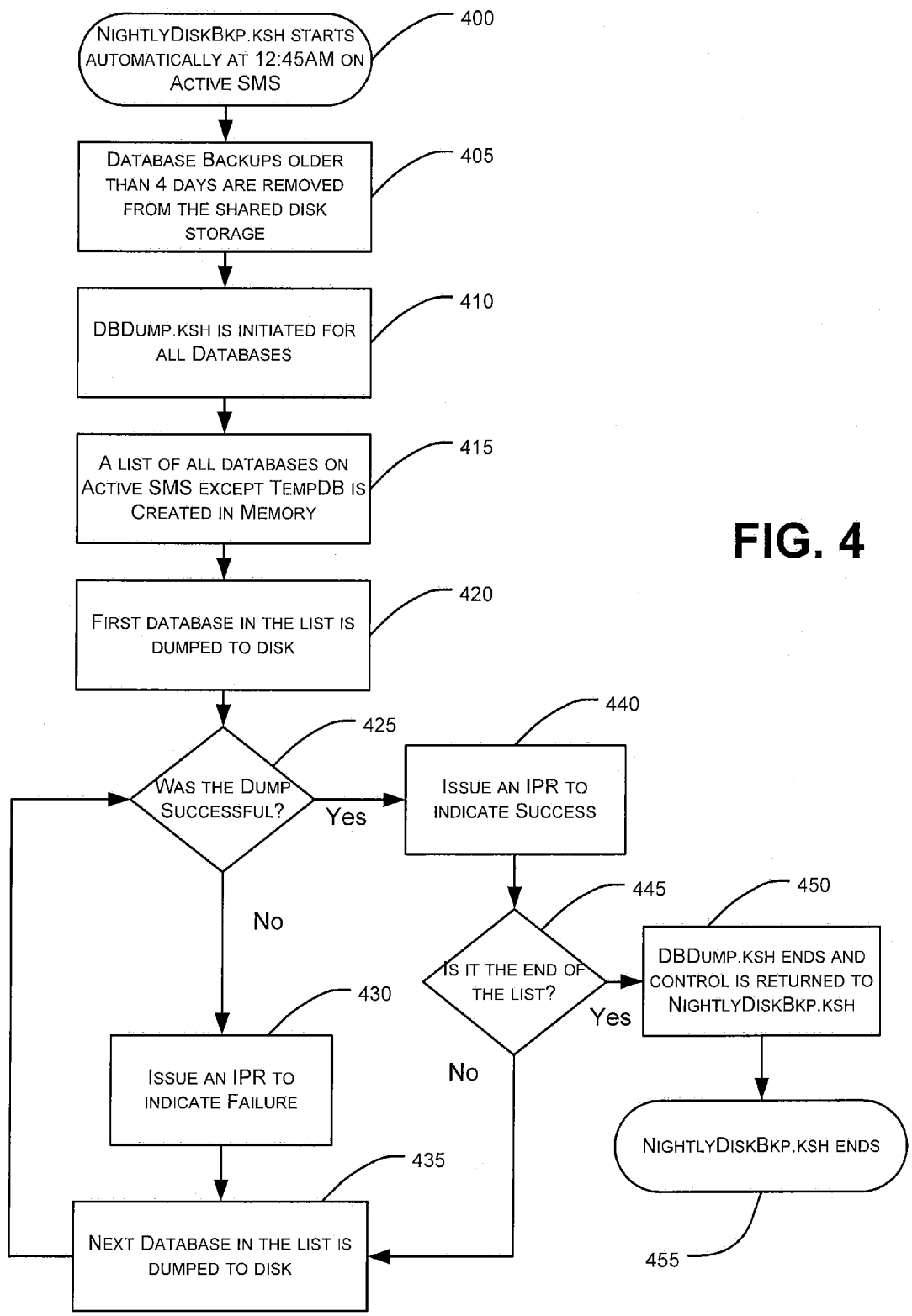
FIG. 4 is a flow chart of a method of a preferred embodiment for nightly backup to a shared storage device.
Figure 5:
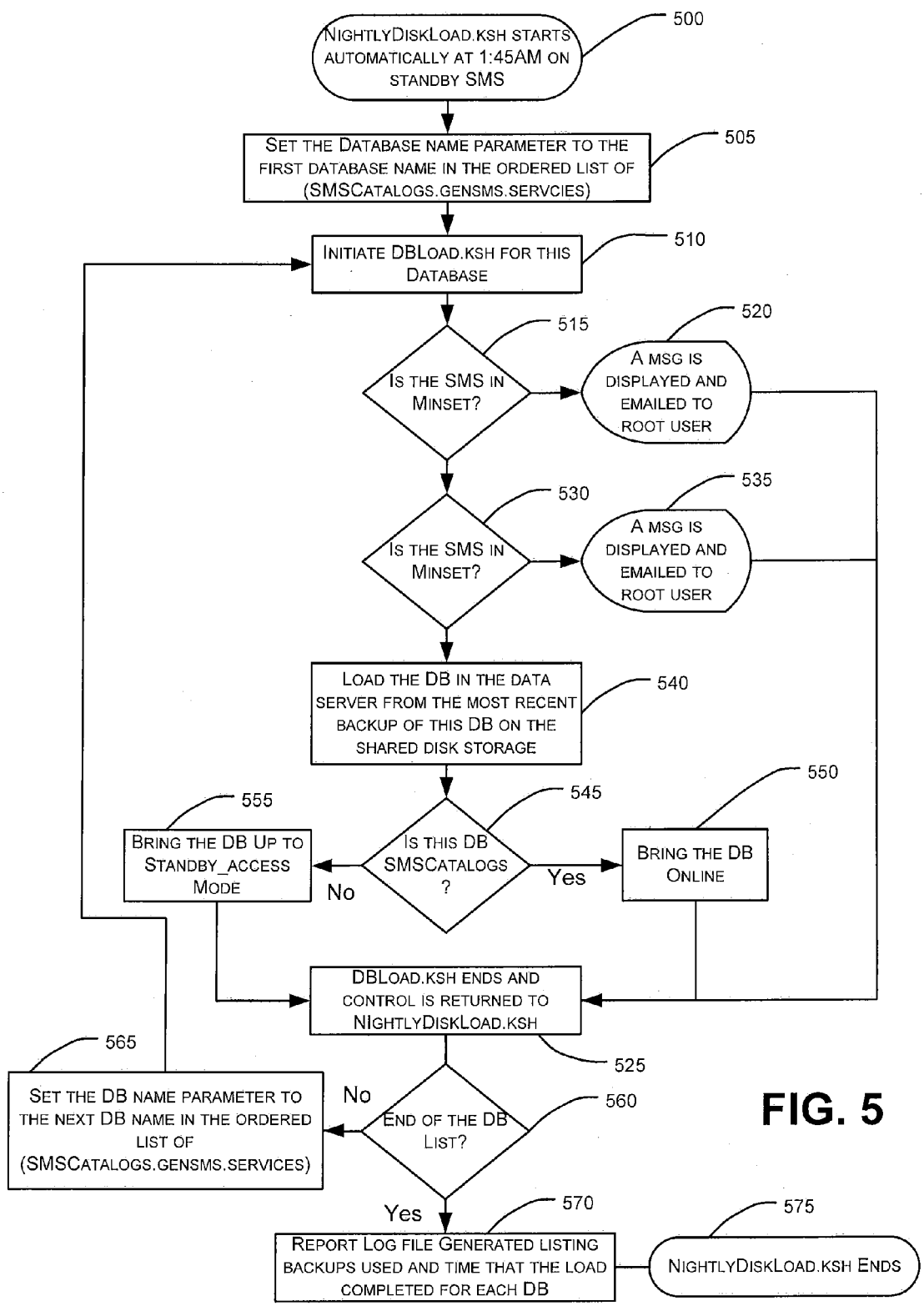
FIG. 5 is a flowchart of a method of a preferred embodiment for nightly restore from a shared storage device.

FIGS. 4 and 5 are flowcharts of nightly backup and restore operations, respectively. In these operations, the nightly backup-and-restore starts at certain times independently and on different systems. The start time for the load on the standby SMS 150 is chosen long enough after the backup starts on the active SMS 140 to make sure the backups have completed. In order to make sure that the load starts immediately after the backups are done, a communication is preferably established between the backup process on the active SMS 140 and the restore process on the standby SMS 150. This communication can be handled through a server process to trigger the load or simply by leaving a file in the shared storage device 240' indicating the success of the backups. The load process then polls the shared storage device 240' for the existence of such file before initiating. Either approach improves the availability by cutting down the time-gap between the backup's completion and the start of the restore process.

Turning first to FIG. 4, the NightlyDiskBkp.ksh program starts automatically at 12:45 AM on the active SMS 140 (act 400). Next, database backups older than four days are removed from the shared storage device 240' (act 405). The dbdump.ksh program is then initiated for all databases (act 410), and a list of all databases on the active SMS 140 except tempdb is created in memory (act 415). The first database is then dumped to the shared memory device (act 420). It is then determined whether the dump was successful (act 425). If the dump was not successful, an IPR is issued to indicate failure (act 430), and the next database on the list is dumped to the shared storage device 240' (act 435). If the dump was successful, an IPR is issued to indicate success (act 440), and it is determined whether the list is at its end (act 445). If the end of the list has not been reached, the next database on the list is dumped to the shared storage device 240' (act 435). If the end of the list has been reached, the dbdump.ksh program ends, and control is returned to the NightlyDiskBkp.ksh program (act 450), which ends (act 455).

Turning now to the flowchart of the nightly restore operation in FIG. 5, the NightlyDiskLoad.ksh program starts automatically at 1:45 AM on the standby SMS 150 (act 500). Then, the database parameter name is set to the first database name in the ordered list of SMSCatalogs, gensms, and services (act 505), and the dbload.ksh program is initiated for this database (act 510). It is then determined if the SMS is in minset, which is required for standby in this embodiment (act 515). If it is not, a message is displayed and emailed to the root user (act 520), and the dbload.ksh program ends, and control is returned to the NightlyDiskLoad.ksh program (act 525). If it is, it is determined whether any user or process is using this database (act 530). If he/it is, a message is displayed and emailed to the root user (act 535). The dbload.ksh program then ends, and control is returned to the NightlyDiskLoad.ksh program (act 525). If he/it is not, the database is loaded into the data server from the most-recent backup of this database on the shared storage device 240' (act 540). It is then determined if this database is SMSCatalogs (act 545). If it is, the database is brought online (act 550), and the dbload.ksh program ends, and control is returned to the NightlyDiskLoad.ksh program (act 525). If it is not, the database is brought up to standby_access mode (act 555), and the dbload.ksh program ends, and control is returned to the NightlyDiskLoad.ksh program (act 525). Next, it is determined if the end of the database list has been reached. If it has not, the database name parameter is set to the next database name in the ordered list of SMSCatalogs, gensms, and services (act 565), and the dbload.ksh program is initiated for this database (act 510). If it has, a report log file is generated listing backups used and the time that the load completed for each database (act 570). The NightlyDiskLoad.ksh program then ends (act 575).

There are many alternatives that can be used with these preferred embodiment. For example, while an AIN platform was used in the examples set forth above, other types of telecommunication systems (i.e., non-AIN systems) can be used. Also, the SSPs 110, 210 can directly transfer network signaling protocols to the SCPs 130, 230 without the use of the STPs 120, 220, and a central office not equipped with an SSP can be provided with software to send messages to the SCPs 130, 230 in an AIN-query format. Further, in the examples described above, both the active and standby SMSs 140, 150 comprise backup/restore circuitry 230, 230'; however, only the backup functionality is active on the active SMS 140, and only the restore functionality is used in the standby SMS 150. In alternate embodiments, the backup/restore circuitry is stored entirely in the active SMS 140, entirely in the standby SMS 150, distributed between the active and standby SMSs 140, 150, or located in a component separate from the active and standby SMSs 140, 150. Further, while the backup/restore circuitry automatically started the backup and restore processes in the examples set forth above, in an alternate embodiment, the backup and/or restore processes are initiated by human interaction.

Further, in the examples described above, both the active SMS and the standby SMS have a shared storage device. Other configurations of the shared storage device are possible. For example, in one alternate embodiment, only one, but not both, of the active and standby SMSs have a shared storage device. This allows the storage device to be added to and managed by one of the SMS platforms (active or standby) with a Network File System (NFS) mounted across the other SMS platform to allow the storage device to be accessible by the other platform. However, if the SMS platform that hosts the storage device becomes unavailable, the storage device may not be accessible by the other SMS platform. As described above, using two separate storages, one on each SMS platform, mitigates this issue and increases the availability of the SMS platform.

Also, by configuring each SMS with a storage device, database backups can be dumped from the active database on the storage device that is hosted by the standby SMS. In this configuration, if the active SMS fails while the load is in progress on the standby SMS, the loading will continue with no interruption. As another alternative, instead of being part of the active and/or standby SMS, the storage device can be a component (stand-alone or part of some other network element) separate from both the active and standby SMSs. Further, instead of using a shared storage device as an intermediary, the database backups can occur directly from the active SMS database to the standby SMS database. Also, while the backup/restore functionality was described above in regard to an SMS, it should be noted that this backup/restore functionality can be used to provide fault tolerance and data redundancy for any telecommunication component, such as, but not limited to, an SCP, SSP, or any other AIN or non-AIN component. Lastly, while the backup/restore functionality described above was implemented on both SMSs, in an alternative embodiment, the backup/restore functionality can be used to backup and restore one, but not both, SMSs.

In a presently preferred embodiment, the SMS 140, 150 uses a Sun E5500 (or Sunfire E6900) hardware platform and a Sun Solaris 8 operating system, the web servers 200, 200' are Apache Tomcat 4.1.29 web servers, the database 210, 210' is managed by a Sybase Adaptive Server Enterprise 12.0 (or 12.5), and the replication server 220, 220' is a Sybase Replication Server 12.0 (or 12.6). In this presently preferred embodiment, each SCP SU database 135 stores 700 MB of data, and the SMS database 210, 210' stores over 19 GB of data. Here, the SMS database 210 stores data pertaining to historical and inactive services logic in addition to active services which are replicated to SCP SU databases 135. It should be noted that the version numbers are subject to change due to software upgrades. Despite future version changes, the functionality described herein remains applicable. That is, the functionality described herein is not dependent on the specific software program or versions used, nor is it affected by backward compatible software upgrades. Of course, any other suitable type of component can be used, and the components mentioned above should not be read into the claims unless explicitly recited therein.

It is intended that the foregoing detailed description be understood as an illustration of selected forms that the invention can take and not as a definition of the invention. It is only the following claims, including all equivalents, that are intended to define the scope of this invention.

What is claimed is:

1. A telecommunication system comprising:
   a first service management system comprising a first database;
   a second service management system comprising a second database;
   a storage device shared by the first and second service management systems;
   first circuitry in communication with the first database and the storage device, the first circuitry operative to store a backup of the first database in the storage device; and
   second circuitry in communication with the second database and the storage device, the second circuitry operative to load the backup of the first database from the storage device to the second database;
   wherein the storage device is located in the second service management system.

2. The telecommunication system of claim 1, wherein the first circuitry is located in the first service management system, and wherein the second circuitry is located in the second service management system.

3. The telecommunication system of claim 1, wherein the first and second circuitry are located in the first service management system.

4. The telecommunication system of claim 1, wherein the first and second circuitry are located in the second service management system.

5. The telecommunication system of claim 1, wherein at least one of the first and second circuitry is located in a component other than the first and second service management systems.

6. The telecommunication system of claim 1 further comprising:
   third circuitry in communication with the second database and the storage device, the third circuitry operative to store a backup of the second database in the storage device; and fourth circuitry in communication with the first database and the storage device, the fourth circuitry operative to load the backup of the second database from the storage device to the first database.

7. The telecommunication system of claim 6, wherein the third circuitry is located in the second service management system, and wherein the fourth circuitry is located in the first service management system.

8. The telecommunication system of claim 1, wherein the storage device is located in the first service management system.

9. The telecommunication system of claim 1, wherein the telecommunication system comprises a second storage device shared by the first and second service management systems and located in the first service management system.

10. The telecommunication system of claim 1 further comprising:
    third circuitry in communication with the second database and the second storage device, the third circuitry operative to store a backup of the second database in the second storage device; and
    fourth circuitry in communication with the first database and the second storage device, the fourth circuitry operative to load the backup of the second database from the second storage device to the first database.

11. The telecommunication system of claim 1, wherein the storage device comprises a disk drive.

12. The telecommunication system of claim 1, wherein the second circuitry is operative to automatically load the backup of the first database from the storage device to the second database.

13. The telecommunication system of claim 1, wherein the first service management system is active when the second service management system is in standby mode, and wherein the first service management system is in standby mode when the second service management system is active.

14. A telecommunication system comprising:
    a processor;
    a memory in communication with the processor, the memory configured to stored computer-executable program code, wherein the computer-executable program codes is configured to:
        store a backup of a first database of a first service management system in a storage device shared by the first service management system and a second service management system, wherein the storage device is located in the second service management system; and
        load the backup of the first database from the storage device to the second database.

15. The telecommunication system of claim 14, wherein the storage device comprises a disk drive.

16. The telecommunication system of claim 14, wherein the computer executable program code is further configured to automatically load the backup of the first database from the storage device to the second database.

* * * * *

UNITED STATES PATENT AND TRADEMARK OFFICE
CERTIFICATE OF CORRECTION

PATENT NO.         : 7,627,099 B2
APPLICATION NO. : 10/961502
DATED              : December 1, 2009
INVENTOR(S)        : Amidi It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 810 days.

Delete the phrase "by 810 days" and insert -- by 1357 days --

Signed and Sealed this

Tenth Day of August, 2010

David J. Kappos
*Director of the United States Patent and Trademark Office*